Jan. 8, 1935.  J. H. LUFT  1,987,071
FLOWER HOLDER
Filed Oct. 31, 1933
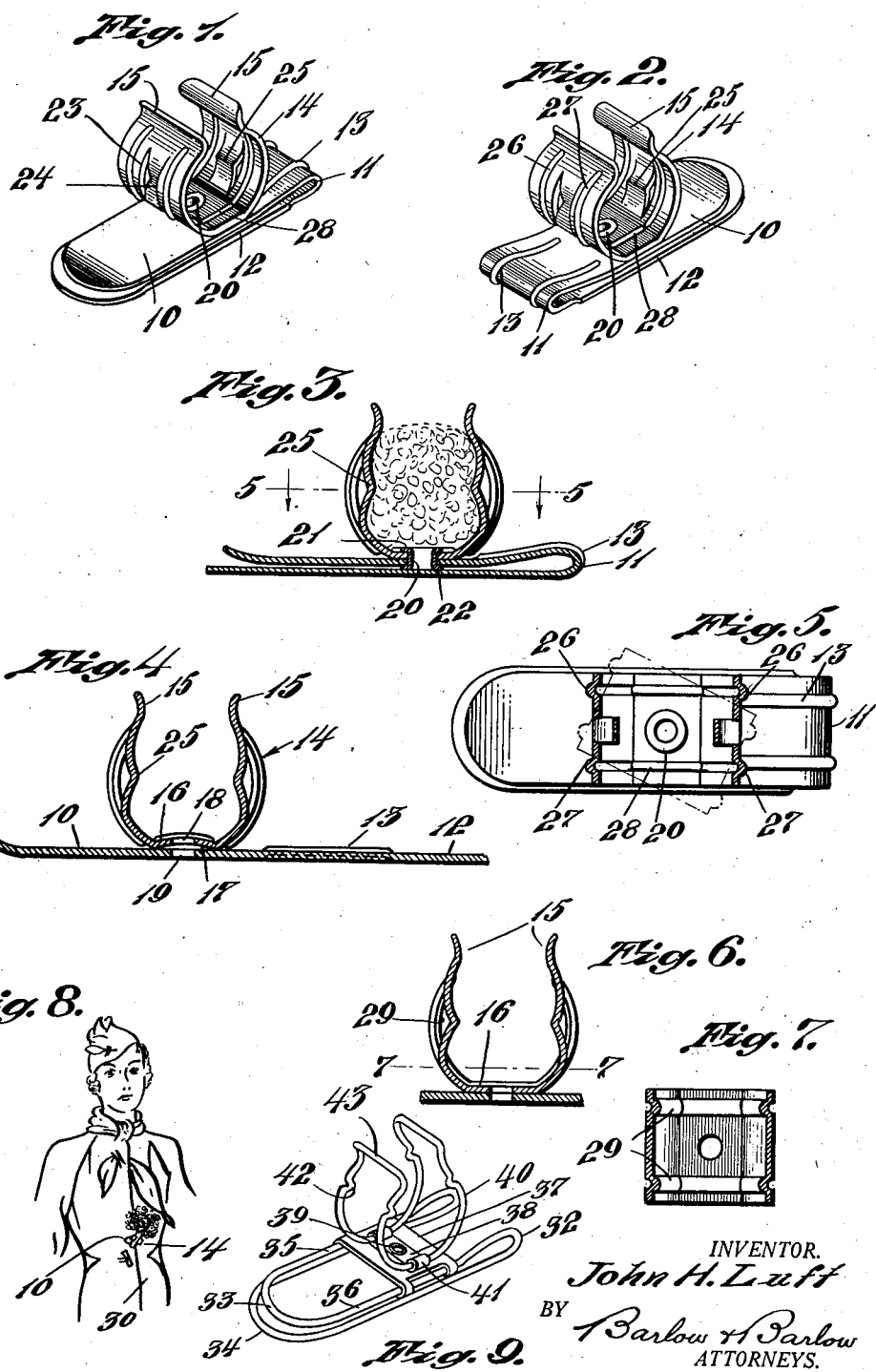
INVENTOR.
John H. Luft
BY Barlow & Barlow
ATTORNEYS.

Patented Jan. 8, 1935

1,987,071

UNITED STATES PATENT OFFICE 1,987,071

FLOWER HOLDER

John H. Luft, Providence, R. I.

Application October 31, 1933, Serial No. 696,034

8 Claims. (Cl. 24—5)

This invention relates to a flower holder; and has for one of its objects the provision of a device which may be easily and quickly secured in position on the wearing apparel for maintaining a bunch of flowers in the desired position.

Another object of the invention is the provision of a flower holder which may be formed by bending and securing separate parts together without the use of solder or heat which might anneal and remove from the stock the inherent resilience thereof.

Another object of the invention is the provision of a flower holder in which the bunch of flowers may be adjusted by movement of the clip which engages the stems of the flowers relative to the base which is secured in mounted position on a garment.

A further object of the invention is the provision of means for causing the stock to be placed under sufficient tension to maintain the swivel arrangement of the parts as desired after they have been moved to adjusted position.

A still further object of the invention is the provision of means within the embracing arms for biting into and engaging the stems of a bunch of flowers to better hold the same in position.

With these and other objects in view, the invention consists of certain novel features of construction, as will be more fully described, and particularly pointed out in the appended claims.

In the accompanying drawing:

Fig. 1 is a perspective view of my improved flower holder looking at one side thereof.

Fig. 2 is a similar perspective view looking at the other side thereof.

Fig. 3 is a longitudinal sectional view thru a portion of the holder.

Fig. 4 is a sectional view illustrating the shape of the clip member prior to its being riveted into position and prior to the folding of the base to shape the same into the form of the engaging jaws.

Fig. 5 is a sectional view on line 5—5 of Fig. 3, and illustrating in dotted lines the clip as being turned about its pivot on the base.

Fig. 6 illustrates the slightly modified form of clip showing the strengthening ribs as raised on the inner surface rather than on the outer surface and extending completely about the clip and thru the more or less flattened portion of its base.

Fig. 7 is a section on line 7—7 of Fig. 6.

Fig. 8 is a perspective view illustrating a bunch of flowers as turned to a desired angle relative to the base and secured in substantially horizontal position on the edge of a coat.

Fig. 9 is a perspective view of a modified form of flower holder.

In the use of my flower holder constructed as disclosed in my Patent No. 1,918,115, granted July 11th, 1933, I find that it is sometimes desirable to adjust a bunch of flowers after the device has been secured in position on a garment; and in order that this may be accomplished without moving the entire holder and its mounting on the garment, I have swivelly arranged a member which directly engages the flowers with reference to the base and maintains sufficient tension or frictional engagement between it and the base so that the holder may be adjusted to assume the desired position. I have also found that it is of advantage to provide a holder which cannot be damaged by inexperienced persons manipulating the same and accordingly I have provided a pair of relatively short arms which are not easily bent and one cannot mistake their use nor will one endeavor to stretch the present arms except by forcing a bunch of flowers thereinto which is intended. And in order that the resilient parts may be strengthened, I have deflected the stock to accomplish this result; and the following is a more detailed description of the present embodiment of this invention illustrating the preferred means by which these advantageous results may be accomplished:—

With reference to the drawing, 10 designates the base of a flower holder, which is here illustrated as formed of sheet stock folded upon itself as at 11, to provide a jaw 12 for tightly gripping the edge of a piece of fabric to maintain the base in position. The resilience of this attaching jaw may be strengthened with reinforcing ribs 13 extending about the fold 11 that a greater tension may be applied to a piece of fabric between the jaws. It will, of course, be understood that in place of folding the base 10 to provide a jaw other means of attachment may be provided such for instance as a pin, as illustrated as one alternative form in my patent above mentioned.

A clip member 14 consisting of sheet stock is bent into generally arcuate form with outwardly flaring ends 15 for the reception of a bunch of flowers which may be forced into the arms which will spread by means of the resiliency of this sheet stock and then close about the bunch of stems to tend to resume as near as possible this arcuate form from which it is deflected.

In order to increase the bearing surface of this member with the base upon which it is mounted, I deflect the stock inwardly as at 16 to provide a reversally curved arcuate portion having a concaved surface 17 towards the base 10. Thru this portion 16 and the base, there are registering openings 18 and 19 for the reception of a hollow rivet 20 which secures the member 14 to the base by reason of its opposite heads 21 and 22 being turned over opposite surfaces of the member and base. The heads of this rivet are drawn in sufficiently tight so as to substantially flatten out the arcuate portion 16 of this member and cause it to have firm frictional engagement with the base along the entire surface thereof by reason of which frictional engagement a bunch of flowers may be adjusted at any desired angle with reference to the base when the same is in mounted position on the garment.

In order to better grip a bunch of flowers the stock of the member 14 is slit at spaced intervals as at 23 and 24 and the portion of the stock between these slits is forced inwardly to provide an engaging projection 25 to force itself into the bunch of flowers and better grip the stems than where a plain concaved surface is provided; and in order that the resilience of the arcuate member 14 may be maintained, I have provided ribs or deflected portions 26 and 27 extending about the general arcuate clip 14 and which may be forced outwardly about the curved portion and inwardly as at 28 along the base engaging portion, as shown in Figures 1 to 5 inclusive, or these ribs may extend inwardly as at 29 throughout the entire extent of the clip member 14 with these portions extending across the base or engaging portions 16, as illustrated in Figures 6 and 7. In either case, they serve to stiffen the stock and better resist the spreading of the parts thus maintaining a stiffer grip upon the stems of the flowers than would otherwise be the case.

In Fig. 8, the base 10 is shown as mounted in horizontal position upon a garment 30, while the clip portion 14 is disposed at an angle to this horizontal, in order to give the flowers the desired angular tilt for better display thereof.

In Fig. 9, I have shown the holder as formed largely from wire bent at 32 to provide opposite jaws 33 and 34 to engage the edge of a garment. Spanning the opposite wires 35 and 36 of the jaw 33 there is a strip of sheet stock 37 which may serve to secure abutting ends of the wire together. Upon this strip 37 there is mounted an arcuate plate 38 by means of a hollow rivet 39 for swivelling the same and on the plate 38 the clip 40 for the flowers is secured by the rolled ends 41. The arms of the clip are arcuate and provided with protuberances 42 for biting into the bunch of flowers, as above indicated which are connected together by a cross rod 43.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A flower holder comprising a base, means for attaching this base to a sheet of fabric of wearing apparel, a member for engaging the stems of a bunch of flowers, and means for swivelly mounting said member on said base, said means for attaching said base being of a length substantially greater than the corresponding dimension of said member.

2. A flower holder comprising a base, means for attaching this base to a sheet of fabric of wearing apparel, a member for engaging the stems of a bunch of flowers, and means for swivelly mounting said member on said base with sufficient friction against relative movement that the member may be held in adjusted position, said means for attaching said base comprising a pair of jaws of a length substantially greater than the corresponding dimension of said member and arranged to extend beyond either side of said member.

3. A flower holder comprising a base, means for attaching this base to an article of wearing apparel, a member for engaging the stems of a bunch of flowers, said member engaging said base at spaced points, and means between said points for pivotally mounting said portion on said base under tension with the stock of said portion under compression by reason of its inherent resiliency.

4. A flower holder comprising a base, means for attaching the base to an article of wearing apparel, a member for engaging the stems of a bunch of flowers, said member having a normally arcuate engaging portion with its concaved surface towards said base, and a rivet extending thru said portion and said base to flex said arcuate portion and maintain it under tension against said base and in firm frictonal engagement therewith.

5. A flower holder comprising a base, means for attaching the base to an article of wearing apparel, an arcuate resilient clip member supported on said base, and reinforcing ribs extending about said member.

6. A flower holder comprising a base, means for attaching the base to an article of wearing apparel, an arcuate resilient clip member supported on said base with projections secured at both ends extending inwardly to better grip the stems of a bunch of flowers.

7. A flower holder comprising a base, means for attaching the base to an article of wearing apparel, a sheet metal arcuate resilient clip member supported on said base, and resilient fingers secured at both ends and resilient in the middle extending inwardly from the inner surface of said member.

8. A flower holder comprising a base, means for attaching the base to an article of wearing apparel, a sheet metal arcuate resilient clip member supported on said base, and fingers extending inwardly from the inner surface of said member, said fingers being formed by slitting and deflecting inwardly the stock of said clip member while leaving the ends of the fingers secured.

JOHN H. LUFT.